Figure 1:
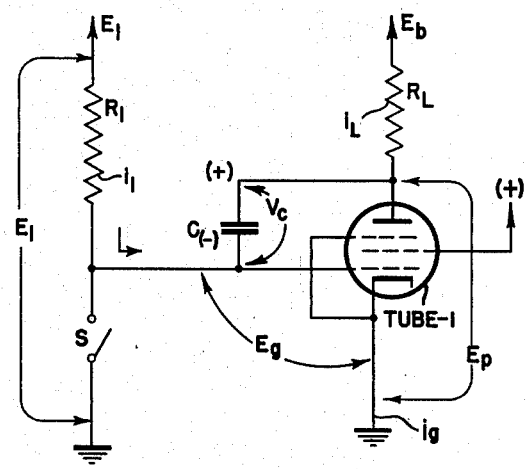

June 15, 1954 C. A. WASHBURN 2,681,411
LINEAR SWEEP CIRCUITS
Original Filed Dec. 16, 1943 2 Sheets-Sheet 1

INVENTOR
CLAYTON A. WASHBURN

BY D. C. Dryden
Joseph Weingarten
ATTORNEYS

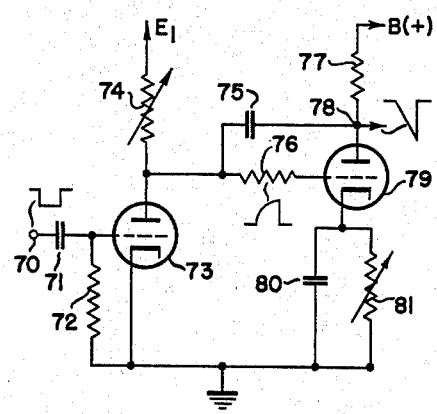
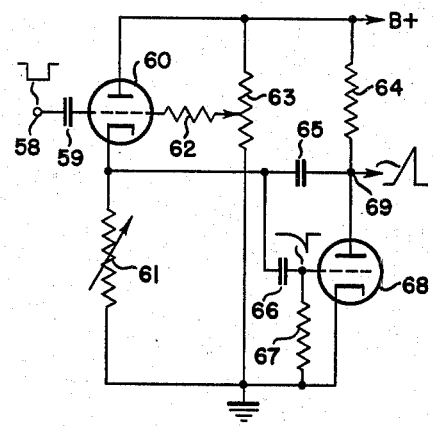
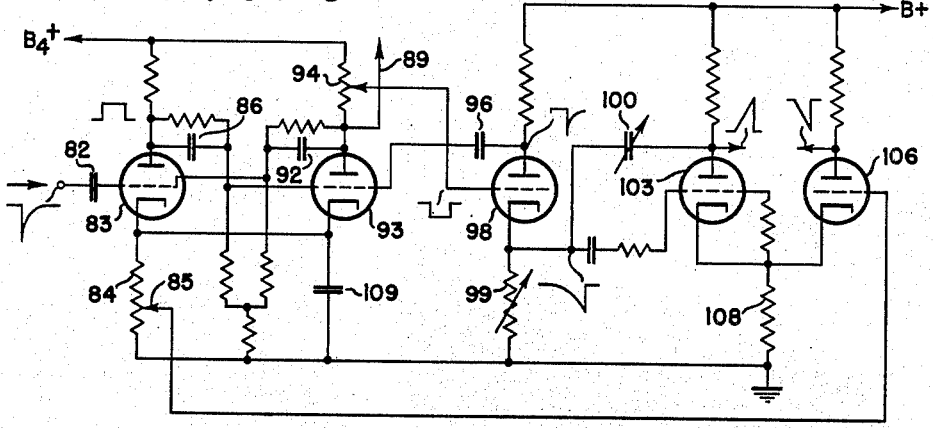

Patented June 15, 1954

2,681,411

UNITED STATES PATENT OFFICE 2,681,411

LINEAR SWEEP CIRCUITS

Clayton A. Washburn, Wood Dale, Ill., assignor, by mesne assignments, to the United States of America as represented by the Secretary of the Navy Original application December 16, 1943, Serial No. 514,536, now Patent No. 2,594,104, dated April 22, 1952. Divided and this application April 24, 1952, Serial No. 284,053

10 Claims. (Cl. 250—27)

This invention relates to electronic apparatus such as cathode ray oscilloscopes, television systems, radio direction and ranging systems, and other similar devices which include circuits for generating voltage or current forms that start at a controlled instant and increase linearly or otherwise with time, and which may be caused to recur periodically or otherwise if desired.

This application is a division of copending application, Serial No. 514,536, filed December 16, 1943, and entitled "Linear Sweep Circuits," now U. S. Patent No. 2,594,104 of April 22, 1952.

In the past, a number of electronic systems have incorporated various circuits for generating voltage or current wave forms which approximate at least in part, linear functions of time. Waves of this type are sometimes called "saw-tooth waves." Another term used herein for these wave forms, namely "linear sweep," is appropriate because such wave forms are most commonly used to cause an electron beam to sweep at a linear rate across the screen of a cathode ray tube.

Although in the past some success was obtained in the generation of linear sweep wave forms at low levels or at relatively slow rates of rise or fall, difficulty has been experienced in preserving the linearity of the wave form in the application of the wave to a load or in the amplification of the wave, because of non-linearity of the characteristics of the load or amplifier or both. When it is desired to drive with a linear sweep wave a load that presents a capacitive or inductive reactance, or both, especially when the load is to be driven through a vacuum tube amplifier, the prior circuits are generally found to be unsuitable particularly when an extremely fast sweep of a high degree of linearity and accurately synchronized with a timing pulse and of accurately controllable characteristics is desired. One of the most difficult tasks for a linear sweep circuit to perform is that of driving a precision-timed, fast linear sweep wave of current through a relatively large inductance, such as the magnetic deflecting coils of a cathode ray tube. In such a case, an additional factor that becomes of importance is the distributed and interwinding capacitance of the inductance circuit which must be charged before the sweep starts, if the sweep is to be very linear.

Linear-sweep-forming circuits generally utilize the initial portion of the exponential charge or discharge characteristic of a series resistance-capacitance circuit of the corresponding property of a resistance-inductance circuit, or, broadly stated, the characteristics of a reactive element subjected to a change of energy level. This approximation to a linear time-function of voltage or current when properly employed deviates from true linearity by a small amount, and in such cases constitutes a substantially "linear sweep."

In the past, the best circuits attained linear sweeps with a degree of linearity throughout the sweep rise, or fall, which was limited by and conforming to the shape of a condenser or inductance charge or discharge curve. In cases where large voltage or current changes were required to produce the sweep it was either necessary to tolerate a bending of the sweep voltage rise owing to the shape of the exponential curve or it was necessary to make the charging supply voltage unreasonably high and the time constants of the sweep-forming circuit high to keep the sweep voltage variation on the early portion of an exponential curve.

The present invention permits a wide change in voltage throughout a linear sweep and with exceedingly good linearity by utilizing in effect the very small initial portion of an exponential curve which deviates little from linearity but which is of small voltage or current "swing" and greatly "expanding" this portion to permit a wide voltage variation but with substantially the same degree of linearity. As will be explained this "expanding" or "extending" of the linear first-portion of an exponential variation is accomplished by a special feedback amplification process.

A general object of this invention is to generate a linear sweep of voltage or current synchronized accurately with conditions in related circuits.

Another object of the invention is to provide a method for generating linear sweep voltages or current with precision and rapidity when driving either a complex load or simple load.

An additional object is to provide electronic means for performing a time-voltage (or current) integration which may be used to generate linear saw-tooth waves or other current or volttage time variations.

A more specific object is to provide for a linear sweep which is of large proportions by effectively "expanding" or "extending" the first small portion of an exponential variation to said large proportion having the same quality of linearity as said small portion.

A further object of the invention is to provide means to change the slope of the linear sweep a predetermined amount without appreciable loss of linearity or timing accuracy.

An additional object of the invention is to provide means in cooperation with a linear sweep generating circuit to generate or cause the generation of a substantially square pulse of voltage, the primary purpose of such pulse being to cause the beam of electrons in the cathode ray tube to be shut off except for desired intervals, such intervals commonly being during the application of said linear sweep.

A still further object is to provide means for "blanking" or shutting off the electron beam in a cathode ray tube employing the linear sweep apparatus of the present invention by automatically producing blanking pulses at a time when the electron beam has reached a predetermined position in said tube, the selected end-position of the sweep, regardless of sweep rapidity or repetition rate.

Figure 2:
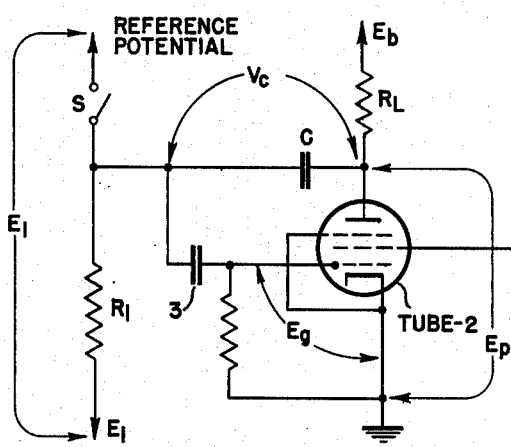
Figure 3:
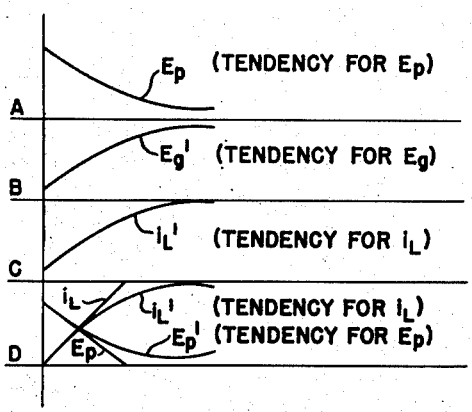

With reference to the figures employed in the description of the invention, Fig. 1 represents a fundamental embodiment, Fig. 2 represents a modification of said embodiment, and Fig. 3 illustrates a point in the description of such embodiment. Fig. 4 shows a practical form of Fig. 1 and Fig. 5 does the same regarding Fig. 2. Figs. 6 and 7 illustrate practical sweep-generating and cathode ray beam control circuits in accordance with the teachings of the invention.

The teachings of one phase of the invention may best be understood by reference to Fig. 1. In this figure, amplifying pentode tube 1 has a cathode connected to ground and a plate electrode connected through resistance $R_L$ to a source of potential which is $E_b$ above ground potential. The first grid, or control grid, of tube 1 is connected through condenser C to said plate and also to the junction of switch S and resistor $R_1$. The other side of switch S is connected to ground and the other side of $R_1$ is connected to a source of potential which is $E_1$ above ground potential as indicated. The function of the circuit is to generate a linear sweep voltage at the plate electrode of tube 1 when switch S, normally closed, is suddenly opened. This may be done repeatedly and switch S may assume a number of convenient forms.

To study the basic manner in which the circuit of Fig. 1 operates to perform the above-mentioned function reference will be made to the various voltages, currents and circuit constants. The equation for the plate current in tube 1 may be expressed $$i_p = -G_m E_g \quad (1)$$

where $G_m$ represents the grid-plate transconductance of tube 1
or $$i_1 = \frac{E_1 - E_g}{R_1} \quad (2)$$

where $i_1$ represents the current through resistor $R_1$. (Note that these relations and the ones to follow represent the variable conditions in parts of the circuit immediately after switch S is opened to the exclusion of D. C. levels.) It will further be observed that the plate potential varies as follows.

$$E_p = R_L i_p \quad (3)$$

In practice, $i_1$ is negligible in comparison with $i_L$, hence the tube current may be used instead of the current $i_p$. On this assumption $$V_c = E_g - E_p = \frac{1}{C}\int_0^t i_1 dt = \frac{1}{R_1 C}\int_0^t (E_1 - E_g) dt \quad (4)$$

also, $$E_g = -\frac{E_p}{R_L G_m} = -\frac{E_p}{A} \quad (5)$$

Substituting from Equation 5 into Equation 4, $$-E_p\left(\frac{A+1}{A}\right) - \frac{1}{R_1 C A}\int_0^t E_p dt = \frac{1}{R_1 C}\int_0^t E_1 dt \quad (6)$$

Upon examination of the second term in the above equation, it will be observed that by keeping the time over which the circuit operates small this term becomes negligible, that is, nearly zero. On this assumption, $$-E_p\left(\frac{A+1}{A}\right) = \frac{1}{R_1 C}\int_0^t E_1 dt \quad (6\text{-}a)$$

and the circuit is capable of performing the time integration of $E_1$. In the generation of linear sweep voltages, $E_1$ will be a constant.

To find a convenient form of Equation 6 it may be differentiated, and becomes:

$$E_p + \frac{E_p}{R_1 C(A+1)} = -\frac{AE_1}{R_1 C(A+1)} \quad (7)$$

Keeping $E_1$ constant, $$E_p = E_1 A\left(1 - E - \frac{t}{R_1 C(A+1)}\right) \quad (7\text{-}a)$$

The starting slope of this equation is $$\frac{dE_p}{dt} = \frac{-E_1 A}{R_1 C(A+1)} \quad (8)$$

Employing sweep lengths which are of a very short duration the derivative (or slope) of Equation 7-a is practically constant (Equation 8) because the exponential term is practically unity.

From this expression it may be observed that with the example circuit of Fig. 1 if switch S is suddenly opened the potential at the plate of tube 1 will instantly commence falling at a linear rate with time and will produce a negative linear sweep. The rate of fall, or slope, of this linear sweep will be as shown in the expression (8).

Fig. 2 illustrates a modification of the circuit of Fig. 1 and is adapted for producing a positive linear sweep voltage at the plate of tube 2 when switch S is suddenly opened. The only differences observed here are that the relative positions of resistance $R_1$ and switch S are reversed with respect to what they were in Fig. 1. Since the reference potential is a relatively large positive voltage with respect to the potential of the cathode of tube 2 and because switch S is normally closed the grid of tube 2 would thus be at a large positive potential making it desirable that D. C. blocking condenser 3 be provided. Condenser 3 in no way affects the operation of the circuit however since it has negligible impedance to the variations in potential across resistance $R_1$.

The equations for the circuit of Fig. 2 become identical with those for Fig. 1 with the exception that the negative sign in the final expression for the variation in plate voltage of the amplifier tube becomes positive in the case of Fig. 2 indicating a positive linear sweep.

From the analysis of the example circuit of Fig. 1, which applies as well to Fig. 2, it will be observed in the final expression for plate voltage that the linearity of the output linear sweep wave is substantially independent of the gain of the amplifier tube. This is practically true for all types of amplifiers and becomes especially correct for high gain tubes such as pentodes and the like. When making the analysis for triode tubes a slight difference must be considered. That is, the pentode or screen grid tube is essentially a constant current generator, which means that the variations in plate current are substantially independent of plate voltage. The gain of the tube and the control grid voltage only determine the plate current. In triode tubes, however, this is not true and the plate voltage must be accounted for in expressing the equation for plate current. Aside from this the analysis may be made following the route of that made herein for a pentode tube. The substance of the circuit diagrams for the triode analogy will be identical to those of Figs. 1 and 2.

One of the distinctive advantages of this invention is that the negative feedback condenser seen in the circuits of Fig. 1 and Fig. 2, and the remaining circuits to be described, functions as a component of the sweep-forming circuits. That is, its function is to cooperate in forming the linear sweep as well as to transfer the non-linearity in the amplifier tube characteristic from the plate to the control grid, thus making the plate voltage variation substantially linear and the grid potential variations differ from linearity by the deviations from linearity of the tube characteristics.

Another method of explaining the manner in which the feedback condenser, also the sweep-forming condenser, functions in cooperation with the remainder of the circuit to produce an exceedingly linear variation in plate potential may be described with reference to Fig. 1. When switch S is closed the lower terminal of condenser C is at ground potential and the upper terminal is at a potential determined by the voltage drop in resistor $R_L$. Both potentials are constant in the initial or quiescent state of the circuit. When switch S is suddenly opened condenser C will tend to discharge through resistance $R_1$, tube 1, and the resistance $R_L$ at a rate determined by the characteristics of the circuit. Initially the charge on condenser C is such that its upper terminal is positive with respect to its lower terminal which is here at ground potential. Thus displacement current $i_1$ through resistor $R_1$ and the condenser C will flow downward through the former and will be a maximum at the start and will tend to fall exponentially to zero as the charge on condenser C becomes accommodated to the new condition in the circuit after the opening of switch S. Fig. 3, which is a voltage-time graph, will serve to illustrate the variations in currents and voltages existing in the operation of the circuit. At A is shown the manner in which the potential $E_p$ at the plate of the tube 1 would tend to vary if condenser C were not connected to the plate terminal but were connected to a source of constant potential instead, i. e., without the negative feedback existing in the circuit therefrom. Neglecting for the moment the non-linearity of the amplification characteristic of the tube this curve would be an exponential function. At B is plotted a graph of the potential variation at the control grid of the tube with the condenser C connected as just described. This is also an exponential variation. The current through $R_L$ under these conditions would appear as plotted at C. (These three graphs are noted as "tendency" for the respective variables which later are noted with a "prime" symbol.) However, since condenser C is connected to the plate of tube 1 and not to a source of constant potential as just supposed, the curves for the potential variations will be altered considerably.

It is clear that a linear decay in voltage at the plate of tube 1 would be obtained if $i_L$, the current through resistance $R_L$, would increase linearly with time instead of increasing at a diminishing rate as in C of Fig. 3. Now, with the type of feedback shown, substantially complete feedback through condenser C, the potential variation at the grid of the amplifier tube is determined primarily by the potential at the plate electrode since the tube is of a high-gain nature. Further, since the grid tends to rise in potential owing to current through $R_1$ thus causing the plate to tend to fall in potential (at a rate greater than the rate of rise of the grid by a factor equal to the gain of the tube) the negative feedback from plate to grid through condenser C will tend to oppose the rise in grid potential. This will thus have the effect of maintaining constant the discharging rate of condenser C. That is, the time-constant of the $R_1$ C circuit is effectively "extended." A high gain tube particularly enhances this effect of maintaining constant condenser charging current since the rise in grid potential is made negligible compared to $E_1$. Constant current flowing into a condenser causes a linear change in voltage to occur across its terminals. Stated another way, a manner which is not an exact description of the phenomena but which roughly illustrates it, and referring now to B of Fig. 3, as the curve of current $i_L$ tends to curve away from linearity according to the exponential characteristic which the grid potential tends to follow (B of Fig. 3), the potential $E_p$ variation also tends to curve, but in the opposite sense. This would mean that the rate at which voltage is fed back to the grid of tube 1 through condenser C increases with the increasing curvature of plate potential variation. In turn, the rate of change of grid potential would increase causing the rate of change of current flow through the tube to increase thus resulting in a corresponding increase in current through $R_L$.

In summary, the effects of condenser C in the circuit are: (1) formation of sweep voltage, (2) feedback of plate voltage variation from plate to grid of the amplifier tube to oppose discharging rate of condenser C and "extend" the linear portion of such exponential discharge to bring about a highly linear saw-tooth wave at said plate, (3) negative feedback, corrects linear sweep for non-linearity in the amplifier tube characteristic.

In practical forms of the circuits of Fig. 1 and Fig. 2 switch S would normally be an electronic device. For instance, the circuits of Fig. 1 and Fig. 2 may take the forms exhibited in Figs. 4 and 5 respectively. In both Figs. 4 and 5 triode tubes are shown for the sweep amplifiers but this does not alter the fundamental considerations. In Fig. 4 tube 73 acts as an electronic switch. The tube is normally conducting and the potential at its plate terminal is at a constant level above ground potential. Upon the application of a negative rectangular pulse of voltage to the grid of tube 73 through condenser 71 the plate current will be immediately stopped for the duration of such negative pulse. This has the effect of opening switch S in Fig. 1. The time-constant of resistor 74 and condenser 75, and $E_1$ (in Fig. 4 $E_1=B+$), primarily determine the slope of the linear sweep voltage appearing at the plate of the tube 79, or point 78, which is the output terminal of the circuit. Variable resistance 81 in combination with condenser 80 provides cathode bias for tube 79 in a known manner. Again, condenser 75 serves both as a component in the sweep-forming circuit and as a negative feedback condenser from the plate of tube 79 to its grid. Tube 79 may be near cut-off normally. Upon application of the negative pulse to the grid of tube 73, the potential at point 78, the plate of tube 79, commences falling.

In Fig. 5, tube 60 now becomes the electronic switch which is operated by a negative square pulse applied to point 58. The time-constant of variable resistor 61 and condenser 65 and the input potential $E_1$ primarily determine the slope of the positive saw-tooth voltage wave appearing at point 69 the plate terminal of tube 68. Potentiometer 63 determines the potential $E_1$ (Equation 8) across $R_1$ (resistor 61). Here the termination of the negative saw-tooth may be brought about by one of two conditions being reached in the circuit, (1) the negative square pulse applied to the grid of tube 60 terminates, or (2) the potential at the cathode of tube 60 falls to substantially the potential at the grid at which point the tube will commence conducting.

As a further feature of the invention the principles of the circuits illustrated in Figs. 1 and 2 along with 4 and 5 have been extended to the arrangements illustrated in Figs. 6 and 7. These latter circuits are designed to be the complete driving and "blanking" circuits for electrostatic cathode ray tube indicators such as would be employed in radar systems. That is, the circuits are adapted for producing linear sweep voltages of selectable slope and synchronized accurately with given trigger voltage impulses, and for producing accurately synchronized blanking voltages for the electron beam in cathode ray tubes. The linear sweep voltages are here produced in push-pull form and are of a predetermined selectable length, another feature of the invention. Their operation will be described in detail subsequently but it will be noted that a novel feature of both of these circuits is that provision is made to automatically turn on the electron beam of a cathode ray tube at the inception of each sweep and to turn it off at a predetermined period during each linear sweep, i. e., when the sweep voltage reaches a given fixed amplitude. This insures that the sweep trace on the indicator tube screen will be of a consistent length regardless of the slope of the saw-tooth wave or its repetition frequency.

With reference to Fig. 6, tubes 83 and 93 are connected in a triggered gate generating circuit. Tube 98 performs as the switching device for the sweep-forming circuit of which tube 103 is the sweep-forming amplifier. The arrangement of the portion of the circuit involving the sweep generation, and including tubes 98 and 103, is similar to that described in Figs. 2 and 4. Tube 106 is operated as an inverting amplifier stage and produces at its plate electrode saw-tooth waves substantially of the same form as those produced at the plate electrode of tube 103 but of opposite polarity. The plate electrodes of tube 103 and 106 may be connected to opposite deflecting plates of a cathode ray tube indicator for producing a linear sweep therein in push-pull fashion. The advantage of using push-pull sweep voltages is, primarily, that the average deflecting plate potential remains constant. This eliminates the tendency for the electron beam to de-focus when passing through the deflecting field. A secondary advantage is that each of the waves need to be generated at but one-half the magnitude required if a "single-ended" deflecting voltage were applied to one deflecting plate, the other plate remaining at constant potential.

In the operation of the circuit in Fig. 6, repeating negative impulses of voltage are applied through condenser 92 to the grid of tube 93 in the gate generating circuit. In consequence of the triggered response of the gate circuit and the constants thereof a gate or negative square voltage pulse is developed across resistor 94. An adjustable tap on this resistor provides for obtaining a selectable portion of this pulse for application to the grid of switch tube 98. The normal flow of current in tube 98 is instantly terminated by the initiation of said pulse. In a manner characteristic of the sweep circuit and which was previously described, a positive linear sweep appears at the plate of tube 103, and a negative linear sweep appears at the plate of 106 by the inverting action. Condenser 100 and resistor 99 may be adjusted to determine the slope of the sweep voltages while the former provides negative feedback to the grid of tube 103 as well.

The termination of the sweep is brought about as a function of sweep amplitude. As the potential at the plate of tube 103 rises linearly, that at the cathode of tube 98 (as the grid of tube 103) falls, but at a much-reduced rate because of tube gain. When the cathode potential of tube 98 falls to a point where it is approximately equal to the potential at the grid electrode, the latter potential remaining approximately constant during the negative pulse, tube 98 immediately conducts and the sweep voltages terminate. Functionally, tubes 98 and 93 form a multivibrator. By adjusting the position of the variable position tap of potentiometer 94 the amplitude of the negative square voltage pulse at the grid of tube 98 may be adjusted, hence controlling the amplitude of the linear sweep voltages generated by the circuit. With well regulated voltage supplies, repeating linear sweep voltages of unvarying amplitude may be obtained from the apparatus and will be substantially independent of other characteristics of such sweeps. The gate circuit generates a gate which is terminated only when tube 98 becomes conducting.

Potentiometer 84 with adjustable contact 85 and located in the cathode circuit of tube 83 is by-passed by condenser 109. Contactor 85 is connected to the grid of 106 and provides a substantially constant bias for this tube permitting the potential at the plate of tube 106 to fall at the same rate as the rate of rise of potential at the plate of tube 103.

Centering of the sweeps on the cathode ray tube, i. e., adjusting the initial and final potential of the saw-tooth voltage wave at the anodes of tubes 103 and 106 and deflecting plates of the cathode ray tube may be accomplished in several ways. By adjusting the position of contact 85 on potentiometer 84 the potential applied to the grid of tube 106 is adjusted determining the amount of plate current in tube 106 during the quiescent periods, that is, before the saw-tooth sweeps commence. In turn, the current conducted by tube 106 produces a corresponding voltage drop in resistor 108, which is common to the cathodes of tubes 103 and 106, biasing tube 103. Thus the initial position of the spot on the cathode ray tube as produced by the electron beam may be adjusted by varying contactor 85. As has been mentioned the amplitude of the sweep voltages is determined by the adjustment of the contactor of potentiometer 94.

In considering the operation of Fig. 6 in the generation of blanking pulses for the cathode ray tube indicator, or, what is the same, generating suitable sensitizing pulses which are adapted to turn on the electron beam in the cathode ray tube during the existence of the linear sweep therein, a connection 89 may be made from the plate of tube 93 to the cathode of the cathode ray tube. It has been mentioned that the constants of the pulse generating circuit comprising tubes 83 and 93 are such that the negative square pulse appearing at the plate of tube 93 tends to be long enough causing the linear sweeps to be terminated by the effect of the falling potential at the cathode of tube 98 reaching the potential at the grid thereof. Actually, however, when the saw-tooth wave terminates by the sudden conduction of tube 98 the negative square pulse is automatically terminated also. This is accomplished by the rapid discharge of condenser 96 when tube 98 suddenly conducts. This discharge of condenser 96 triggers off tube 93, and the square pulse at the plate of tube 93 is terminated. As mentioned, connection 89 may be applied to the cathode of the cathode ray tube to turn on the electron beam during the existence of the saw-tooth wave. Alternatively, the plate of tube 83, which produces a positive square pulse of the same duration as the negative square pulse of the plate of tube 93, may be connected to the control grid of the cathode ray tube to produce the same effect.

Fig. 7 illustrates another form of the invention similar in some respects to that of Fig. 6 but simpler in construction. In this arrangement tubes 112 and 119 are connected in a pulse generating circuit which is triggered periodically by a positive impulse of voltage applied to point 110, hence through a condenser 111 to the grid of tube 112. Tube 119 also acts as the switching device of the sweep generating circuit. Tube 127 is the sweep amplifier and condenser 123 is the sweep and feedback condenser as before. Tube 130 inverts the negative saw-tooth wave generated at the plate of tube 127, or point 132, and produces a positive saw-tooth wave at point 133. A negative square voltage pulse is generated at the plate of tube 112, or point 113, and a positive square pulse of voltage at the plate of tube 119, both being of a duration equal to the length of the saw-tooth wave as will be explained. The negative square pulse appearing at the plate of tube 112 may be applied to the cathode of the cathode ray tube indicator to turn on the electron beam during the existence of the linear sweep.

In the operation of the circuit of Fig. 7, the positive square pulse at the plate of tube 119 is initiated by the positive trigger impulse applied to the grid of the tube 112. Tube 119 is normally conducting and passes a certain grid current through resistor 121, thus placing point 122, or the grid of tube 127, at a fixed potential. Such potential places tube 127 in a condition where it is normally only slightly conducting. As tube 112 commences conducting at the advent of the positive square pulse at its grid the potential at the commonly connected cathodes of the two tubes, 112 and 119, rises by virtue of the increased current through resistor 120. This changes the effective bias on tube 119 and decreases its current flow causing the potential at its plate to rise suddenly, which rise is in turn coupled back through condenser 115 to the grid of tube 112 increasing the current in the latter still further. Hence, in trigger circuit fashion tube 119 is cut off, which tends to cause point 122 to suddenly rise in potential. This it cannot do because of the charge on condenser 123. As a result, a linear saw-tooth wave is produced at the plate of tube 127 essentially according to the teachings of the device of Fig. 1.

During the generation of the linear sweep voltages the potential at point 122 rises at a rate somewhat less than linearly. The potential at the cathode of tube 119 remains substantially constant for the duration of the positive square pulse. The rising potential at point 122 will reach a critical point where tube 119 will again commence to conduct, thus terminating the square voltage pulse and the linear sweep. Thus, the sweep length and pulse length, as in Fig. 6, are here a function of sweep amplitude also.

In regards to centering the sweep on the cathode ray tube screen, the initial deflection of the electron beam, or the starting point of each linear sweep, is determined by the quiescent conducting conditions of tubes 127 and 130, which in turn may be adjusted by resistor 120. The bias of tube 119 depends upon the setting of variable resistor 120 which therefore controls the amount of grid current drawn through resistor 121. Since the normal bias of tube 127 is determined by the current through resistor 121 the initial currents in tubes 127 and 130 are determined by the magnitude of resistor 120. Potentiometer 118 with adjustable contactor 117 determines the magnitude of the linear sweep voltages. That is, by moving contact 117 nearer the potential at the plate of tube 119, the magnitude of the positive voltage pulse at the cathode of tube 119 is increased. Thus the rising potential at point 122 during the linear sweep must reach a higher value before tube 119 will conduct terminating the sweep and square pulse.

Both in Figs. 6 and 7 the square pulse generating circuits are of the triggered types. They need not be, however, but may be free-running multivibrators for instance. The reason for showing them as triggered circuits is that the most useful application of the precision sweep circuits of the present invention is in radar systems, and in this application the sweep traces on the cathode ray tube indicator must commence simultaneously with the transmission of a pulse from the radar transmitter in order that range to reflecting objects may be measured accurately on the cathode ray indicator.

In various instances throughout the description of the drawings it will be clear that by suitable modifications inductance-resistance elements instead of capacitance-resistance elements could have been employed in the sweep generating function. This, in the majority of cases, however, is a disadvantage since additional feedback means must be provided. The forms shown, although not as limitations, are most convenient applications of the teachings of the invention.

In the claims, whenever reference is made to the connection of two or more points or circuit elements the intention is to include connections through coupling condensers or direct coupling with simple conductors, unless otherwise stated. That is, coupling condensers as employed herein are for the purpose of providing D. C. isolation for various parts of the circuits. This does not refer to the feedback and sweep-forming condenser, although it also is necessarily a D. C. blocking condenser in some instances.

The description of the invention and several of its more useful applications has been an attempt to illustrate its scope. The main feature, however, lies in a method for performing the accurate integration of a varying or constant voltage or current, which may vary at a very rapid rate. Since the use of such feature most commonly will be for the generation of linear sweeps, and since the inventor has already evolved a number of precision circuits accordingly adapted the description has been centered around this phase of the teachings presented. The claims are intended to set forth the invention in its true scope regardless of the limitations in the above description.

What is claimed is:

1. A circuit for generating a linear sweep of controlled amplitude and a voltage pulse of the same duration as that of said linear sweep comprising, first, second and third electron tubes each having at least an anode, a cathode and a control grid, means resistively connecting the anode of said first tube to a first source of positive potential, means connecting the control grid of said first tube through a resistance to said source of positive potential and through a condenser to the anode of said first tube, means connecting said second and third tubes as a voltage pulse generating circuit including means connecting the cathodes of said second and third tubes together and through a resistor to a point of reference potential and means resistively connecting the anodes of said second and third tubes to a second source of positive potential, means directly connecting the control grids of said first and third tubes, means for coupling a triggering impulse to the control grid of said second tube, and means for adjusting the amplitude of the pulse appearing at the cathode of said second and third tubes during said sweep thereby adjusting the amplitude of said linear sweep.

2. A circuit for generating a linear sweep voltage of controlled amplitude and a voltage pulse of the same duration as that of said sweep comprising, a first electron tube having at least an anode, a cathode and a control grid, a first resistor connected between the control grid of said first tube and a source of positive potential, a condenser connected between the control grid and anode of said first tube, a second electron tube having at least an anode, a cathode and a control grid, means directly connecting the control grids of said first and second tubes together, said second tube being normally conducting whereby grid current flows through said first resistor and produces a predetermined voltage at the control grid of said first tube prior to the initiation of a sweep, means for abruptly cutting off said second tube whereby the potential at the control grid of said first tube tends to rise and a linear sweep is produced at the anode of said first tube, said second tube being biased to again conduct when the potential at the control grid thereof reaches a predetermined value, thereby producing a rectangular pulse at the anode of said second tube and terminating the sweep voltage appearing at the anode of said first tube.

3. A circuit for generating a linear sweep voltage of controlled amplitude and a voltage pulse of the same duration as that of said sweep comprising, a first electron tube having at least an anode, a cathode and a control grid, a first resistor connected between the control grid of said first tube and a source of positive potential, a condenser connected between the control grid and anode of said first tube, said first resistor and said condenser determining the time constant of said sweep voltage, a second electron tube having at least an anode, a cathode and a control grid, means connecting the control grids of said first and second tubes together, means for energizing said second tube to be normally conducting whereby grid current flows through said first resistor and produces a predetermined voltage at the control grid of said first tube prior to the initiation of a sweep, means for abruptly cutting off said second tube whereby the potential at the control grid of said first tube tends to rise and a linear sweep is produced at the anode of said first tube, and means biasing said second tube to again conduct when the potential at the control grid thereof reaches a selected value, thereby producing a rectangular pulse at the anode of said second tube and terminating the sweep voltage appearing at the anode of said first tube.

4. Apparatus in accordance with claim 3 comprising, in addition, a variable resistor in the cathode circuit of said second tube for adjusting the starting potential of each linear sweep voltage.

5. Apparatus in accordance with claim 4 comprising, in addition, means for adjusting the bias of said second tube to control the potential at the cathode of said second tube during non-conduction thereof thereby controlling the amplitude of said linear sweep voltage.

6. A circuit for generating a linear sweep voltage of controlled amplitude and a rectangular voltage pulse of the same duration as that of said sweep voltage comprising, a first electron tube having at least an anode, a cathode and a control grid, first and second resistors respectively connected between the control grid and anode of said first tube and a source of positive potential, a condenser connected between the control grid and anode of said tube, said first resistor and said condenser determining the time constant of said sweep voltage, a voltage pulse generating circuit of the triggered type adapted to be triggered by an impulse and comprising second and third electron tubes each having at least a cathode, an anode and a control grid, the cathodes of said second and third tubes being connected together and through a variable resistance to a point of ground potential, means coupling the control grid of said second tube to the anode of said third tube, means for energizing said second and third tubes to render said second tube normally non-conducting and said third tube conducting, means connecting the control grid of said third tube to the control grid of said first tube whereby grid current flow in said third tube during conduction thereof produces a predetermined voltage at the control grid of said first tube, means for applying a positive triggering impulse to the control grid of said second electron tube to start conduction thereof and thereby abruptly cut off said third tube whereby the potential at the control grid of said first tube tends to rise and a linear sweep is produced at the anode of said first tube, and means biasing said second tube to again conduct when the potential at the control grid thereof exceeds a selected value whereby a rectangular pulse is produced at the anode of said third tube and a linear sweep voltage of the same duration is produced at the anode of said first tube.

7. A circuit for generating a linear sweep voltage of controlled amplitude and a rectangular voltage pulse of the same duration as that of said sweep voltage comprising, a first electron tube having at least an anode, a cathode and a control grid, first and second resistors respectively connected between the control grid and anode of said first tube and a source of positive potential, a condenser connected between the control grid and anode of said tube, said first resistor and said condenser determining the time constant of said sweep voltage, a voltage pulse generating circuit comprising second and third electron tubes each having at least a cathode, an anode and a control grid, the cathodes of said second and third tubes being connected together and through a resistance to a point of reference potential, means including a condenser coupling the control grid of said second tube to the anode of said third tube, means for energizing said second and third tubes to render them normally non-conducting and conducting, respectively, means directly connecting the control grids of said third and first tubes together whereby grid current flows in said third tube during conduction thereof and produces a predetermined voltage at the control grid of said first tube, means for initiating conduction in said second tube whereby said third tube is abruptly cut off and the potential at the control grid of said first tube tends to rise and a linear sweep is produced at the anode of said first tube, said second tube being biased to again conduct when the potential at the control grid thereof exceeds a predetermined magnitude whereby a rectangular pulse is produced at the anode of said third tube and a linear sweep voltage of the same duration is produced at the anode of said first tube.

8. Apparatus in accordance with claim 7 in which the resistor in the cathode circuit of said first and second tubes is variable whereby the starting potential of each linear sweep voltage may be adjusted.

9. Apparatus in accordance with claim 7 including means for adjusting the bias of said second tube to control the potential at the cathode of said second tube during non-conduction thereof whereby the amplitude of said linear sweep voltage may be controlled.

10. Apparatus in accordance with claim 7 in which the resistor in the cathode circuit of said second and third tubes is variable whereby the amplitude of the pulse appearing at the cathodes of said second and third tubes during said linear sweep may be adjusted to control the average potential at the anode of said first tube and including means for adjusting the bias of said second tube whereby the amplitude of said linear sweep voltage may be controlled.

References Cited in the file of this patent

UNITED STATES PATENTS

| Number | Name | Date |
| --- | --- | --- |
| 2,405,237 | Ruhlig | Aug. 6, 1946 |
| 2,412,063 | Rosentreter | Dec. 3, 1946 |
| 2,412,485 | Whiteley | Dec. 10, 1946 |
| 2,438,638 | Lakatos | Mar. 30, 1948 |